United States Patent
Hughes et al.

(10) Patent No.: US 9,217,087 B2
(45) Date of Patent: Dec. 22, 2015

(54) CORROSION INHIBITORS

(71) Applicant: CRODA, INC., Edison, NJ (US)

(72) Inventors: John Ernest Hughes, Lincoln University, PA (US); William Harry McNamee, Claymont, DE (US)

(73) Assignee: CRODA, INC., Edison, NJ (US)

( * ) Notice: Subject to any disclaimer, the term of this patent is extended or adjusted under 35 U.S.C. 154(b) by 0 days.

(21) Appl. No.: 14/375,001

(22) PCT Filed: Jan. 29, 2013

(86) PCT No.: PCT/US2013/023568
§ 371 (c)(1),
(2) Date: Jul. 28, 2014

(87) PCT Pub. No.: WO2013/116191
PCT Pub. Date: Aug. 8, 2013

(65) Prior Publication Data
US 2015/0040796 A1    Feb. 12, 2015

Related U.S. Application Data

(60) Provisional application No. 61/592,800, filed on Jan. 31, 2012.

(51) Int. Cl.
*C23F 11/10* (2006.01)
*C23F 11/08* (2006.01)
*C23F 11/167* (2006.01)
*C09D 5/08* (2006.01)

(52) U.S. Cl.
CPC ............... *C09D 5/086* (2013.01); *C09D 5/082* (2013.01); *C23F 11/08* (2013.01); *C23F 11/10* (2013.01); *C23F 11/1673* (2013.01)

(58) Field of Classification Search
CPC ........ C09D 5/082; C09D 5/086; C23F 11/08; C23F 11/10; C23F 11/167; C23F 11/1673
USPC ....................................................... 106/14.41
See application file for complete search history.

(56) References Cited

U.S. PATENT DOCUMENTS

| | | | |
|---|---|---|---|
| 1,992,689 A | 2/1935 | Cox | |
| 3,699,052 A | 10/1972 | Petrey, Jr. | |
| 3,945,955 A | 3/1976 | Ihde, Jr. | |
| 3,976,494 A * | 8/1976 | Kudo et al. | 106/14.45 |
| 4,087,597 A | 5/1978 | Hafeli | |
| 4,389,371 A | 6/1983 | Wilson et al. | |
| 4,604,226 A | 8/1986 | Barlett | |
| 5,399,274 A * | 3/1995 | Marcus | 508/195 |
| 5,611,992 A | 3/1997 | Naraghi et al. | |
| 7,481,877 B2 | 1/2009 | Gichuhi et al. | |
| 2009/0099048 A1 | 4/2009 | Zhao et al. | |

FOREIGN PATENT DOCUMENTS

GB    1579217 A    11/1980

OTHER PUBLICATIONS

International Search Report of PCT/US2013/023568 (WO 2013/116191), Issued May 15, 2013.

* cited by examiner

*Primary Examiner* — Anthony J Green
(74) *Attorney, Agent, or Firm* — RatnerPrestia

(57) ABSTRACT

A corrosion inhibitor composition for use in coating compositions on metal surfaces, or in metal containers, to provide corrosion resistance to said metals. The corrosion inhibitor comprises at least one alkoxylated phosphate ester; and at least one borate ester. The corrosion inhibitor composition optionally comprises at least one inorganic metal salt. There is also provided an end-use coating composition comprising said corrosion inhibitor composition, and a method of providing corrosion resistance to a metal surface by applying said coating composition thereto.

24 Claims, No Drawings

CORROSION INHIBITORS

CROSS REFERENCE TO RELATED APPLICATIONS

This application is the U.S. National Phase application of PCT International Application No. PCT/US2013/023568, filed Jan. 29, 2013, and claims priority of U.S. Provisional Patent Application No. 61/592,800 filed Jan. 31, 2012, the disclosures of which are incorporated herein by reference in their entireties for all purposes.

The present invention relates to corrosion inhibitors, and in particular combinations of compounds which have advantageous properties with regard to corrosion inhibition when used in a composition comprised in a metal container or as applied to metal surfaces as part of a coating or paint composition.

The prevention of corrosion of metal surfaces has been a serious problem, particularly when such metal surfaces have been exposed to water, rain or snow, subjected to conditions of high humidity and confronted with an atmosphere high in acidic materials. Such corrosion problems are of primary importance not only in the ferrous metal field but also of considerable importance for many of the non-ferrous metals.

Corrosion problems are also seen in the fields of aluminium or steel substrates in both aqueous or alcohol environments such as in spray cans, during wash or rinses for aluminium based metals prior to and during machining.

Several prior attempts have been made to provide effective corrosion inhibitors. In some cases the metal surface has been coated with materials that shield the metal surface from its hostile environment, but this procedure has not always been effective, for the coating material will often fail to remain on the metal, in whole or in part, leaving the exposed metal surface open to corrosion. In other cases, the metal surfaces have been coated with materials, such as oils or waxes, having incorporating therein a corrosion inhibitor to inhibit corrosion of such metal surfaces. These materials tend to be easily removed from the metal surface; thus their usefulness is minimal at best.

Paints, with or without corrosion inhibitors, have also been used to coat material surfaces to inhibit corrosion thereof, but with mixed success. The inhibitor is dispersed throughout the body of the paint film and the only portion of the total corrosion inhibitor that is effective is the small amount on the inner surface of the paint film that interfaces with the adjacent metal surface.

Corrosion inhibiting paints for metals, such as steel, are known. Corrosion inhibiting primers generally fall within two broad categories: those which provide high barrier coatings and those which impart active corrosion inhibiting properties. The high barrier coatings may include various epoxies, alkyds, polyurethanes and the like. Among the corrosion inhibitor primers are zinc-rich coatings which provide cathodic protection.

Direct-to-metal (DTM) acrylic paints are known to negate the need for a initial separate paint coating. However, one disadvantage of using the DTM acrylic paints is that when used on mild steel substrates they show poor corrosion resistance and flash rust.

As a result, the industry is in search of improved corrosion inhibitors which perform well and are environmentally acceptable.

The present invention therefore seeks to provide a corrosion inhibitor composition which can both exhibit improved corrosion inhibitor properties, and which overcomes the disadvantages of the prior attempts as described herein especially when used in acrylic paints. The present invention further seeks to provide a method of making the corrosion inhibitor composition having improved properties.

The present invention also seeks to provide a corrosion inhibitor coating composition, especially a paint composition, wherein said coating composition provides improved corrosion inhibition properties when applied to metal surfaces.

According to a first aspect of the present invention there is provided a corrosion inhibitor composition comprising;
at least one alkoxylated phosphate ester; and
at least one borate ester.

According to a second aspect of the present invention there is provided a method of making a corrosion inhibitor composition comprising mixing;
at least one alkoxylated phosphate ester; and
at least one borate ester.

According to a third aspect of the present invention there is provided a coating composition comprising from 0.01 to 10 wt. % of a corrosion inhibitor composition in accordance with the first aspect.

According to a fourth aspect of the present invention there is provided a method of providing corrosion resistance to a metal surface, said method comprising applying a coating composition in accordance with the third aspect.

According to a fifth aspect of the present invention there is provided the use of a coating composition in accordance with the third aspect for imparting corrosion resistance to a metal surface to which it is applied.

According to a sixth aspect of the present invention there is provided a method of providing corrosion resistance to a metal surface of a container, said method comprising contacting said metal surface with a corrosion inhibitor composition comprising at least one alkoxylated phosphate ester, and at least one borate ester.

Surprisingly, it has been found that the combination of the alkoxylated phosphate ester and borate ester provides a composition which can impart improved corrosion resistance when applied to a metal surface. In particular, the combination can be added to paint compositions at low levels, and improve the corrosion resistance of the paints when used on, for example, steel substrates. Alternatively, the combination is also found to improve corrosion resistance for metal cans when mixed in to the composition contained therein.

The term "corrosion inhibitor" and "corrosion resistance" as used herein refers to composition which may inhibit or reduce levels of corrosion of a metal surface to which they are applied or are in contact with.

The alkoxylated phosphate ester may be selected from an ester of at least one fatty alcohol, at least one fatty phenol, or a combination thereof.

The alkoxylated fatty alcohol phosphate ester or alkoxylated fatty phenol phosphate ester may be selected from compounds having general structure (I):

wherein
$R^1$, $R^2$, and $R^3$ each independently represent a hydroxyl group or a residue of an alkoxylated fatty alcohol or alkoxylated fatty phenol.

The alkoxylated fatty alcohol residues and alkoxylated fatty phenol residues bonded to the phosphate ester may be according to formula (II):

$$—O-(AO)_x-(Ph)_y-R^4 \quad (II)$$

The group $R^4$ may be selected from a fatty moiety. Said fatty moiety may be saturated or unsaturated, linear or branched, and/or substituted or unsubstituted.

If unsaturated fatty moieties are used, they may be selected from fatty moieties having either a cis/trans configuration, and may comprise one or more than one unsaturated double bonds.

Preferably, the fatty moieties used are saturated fatty moieties. Preferably, the fatty moieties used are linear fatty moieties. More preferably, the fatty moieties used are saturated linear fatty moieties.

For alkoxylated fatty alcohol residues, suitable fatty moieties may be selected from those comprising a total of 5 to 22 carbon atoms. Preferably, the fatty moiety comprises from 8 to 18 carbon atoms. Most preferably, the fatty moiety comprises from 10 to 15 carbon atoms.

For alkoxylated fatty alcohol residues, suitable fatty moieties may be selected from those comprising a total of 5 to 18 carbon atoms. Preferably, the fatty moiety comprises from 6 to 15 carbon atoms. Most preferably, the fatty moiety comprises from 7 to 11 carbon atoms.

It will be understood that, when describing the number of carbon atoms, this refers to the total number of carbon atoms present in the fatty moiety, including any present in any branch groups.

The group AO as shown in formula (II) represents an oxyalkylene group. The term 'oxyalkylene' as used herein, generally refer to molecular structures containing the following repeating units: $—R^5—O—$, wherein $R^5$ represents a lower alkyl.

The term 'lower alkyl' as used herein, unless otherwise defined, refers to saturated hydrocarbon radicals being straight chain, or branched moieties, containing 1 to 8 carbon atoms. Preferably, the lower alkyl groups each contain 1 to 6 carbon atoms. More preferably, 1 to 4 carbon atoms.

Examples of lower alkyl radicals may be independently selected from methyl, ethyl, n-propyl, isopropyl, n-butyl, isobutyl, sec-butyl, tert-butyl, 2 methyl-butyl, pentyl, or hexyl.

The oxyalkylene group AO may be selected from oxyethylene, oxypropylene, oxybutylene, and oxytetramethylene. Preferably, the oxyalkylene group is selected from oxyethylene (EO) and oxypropylene (PO).

The oxyalkylene group may be used in the residue of an alkoxylated fatty alcohol or alkoxylated fatty phenol in a non-polymerised form and therefore the value of x would be 1.

Preferably, the oxyalkylene group AO may be oligomerised or polymerised to give a (poly)oxyalkylene chain $[(AO)_x]$ comprising x oxyalkylene monomer units. In such a (poly)oxyalkylene chain the value x represents an integer preferably having a value in the range from 2 to 30. Preferably, x is an integer having a value in the range from 3 to 20. More preferably, x is an integer having a value in the range from 4 to 10. Most preferably, x is an integer having a value in the range from 5 to 7.

The alkoxylated fatty alcohol residues and alkoxylated fatty phenol residues may therefore preferably have between about 2 and about 30 moles of the alkoxylating moieties present for each fatty alcohol or fatty phenol moiety. Preferably, between about 5 and about 7 moles of the alkoxylating moieties present.

The (poly)oxyalkylene chain may be homogeneous in that it comprises only one specific type of oxyalkylene monomer unit.

Alternatively, the oxyalkylene monomer units may vary along the (poly)oxyalkylene chain. The (poly)oxyalkylene chain may be a random (statistical) or block copolymeric chain.

Where the oxyalkylene monomer units vary along the (poly)oxyalkylene chain, derivatives having a mixture of random oxyethylene and oxypropylene units are preferred. In such an embodiment the mixture of oxyethylene and oxypropylene groups in the (poly)alkoxylene chain may preferably have a molar ratio of oxyethylene to oxypropylene groups of from 1:5 to 10:1, particularly 1:3 to 3:1 respectively.

The (poly)oxyalkylene group $(AO)_x$ may have a number average molecular weight in the range from 30 to 3,840, preferably from 100 to 1,000, and most preferably from 200 to 300.

The group Ph of formula (II) represents a phenylene group, which may be substituted with one or more substitution groups. Suitable substitution groups may be selected from lower alkyl, halo, and hydroxyl.

The term 'lower alkyl' is as defined elsewhere in the description.

The term 'halo' as used herein, unless otherwise defined, refers to halide radicals derived from elements in Group VII (Group 17) of the periodic table. The halide radicals may be independently selected from fluoro, chloro, bromo, or iodo.

The value y is an integer and has a value of either 0 or 1. It will be understood that for alkoxylated fatty alcohol residues the value of y will be 0, and for alkoxylated fatty phenol residues the value of y will be 1.

The alkoxylated fatty alchohol residues and alkoxylated fatty phenol residues may be derived from natural fatty alcohols or fatty phenols which are subsequently alkoxylated.

Preferred, optionally naturally derived, fatty alcohols may comprise between 8 and 20 carbon atoms. Suitable, optionally naturally derived, fatty alcohols may be selected from capryl alcohol, pelargonic alcohol, capric alcohol, undecyl alcohol, lauryl alcohol, tridecyl alcohol, myristyl alcohol, pentadecyl alcohol, cetyl alcohol, heptadecyl alcohol, and stearyl alcohol.

Particularly preferred, optionally naturally derived, fatty alcohols may be selected from lauryl alcohol, tridecyl alcohol, or myristyl alcohol.

Suitable, optionally naturally derived, fatty phenols may be selected from hexyl phenol, heptyl phenol, octyl phenol, nonyl phenol, decyl phenol, undecyl phenol, dodecyl phenol, tridecyl phenol, tetradecyl phenol, or pentadecyl phenol.

Particularly preferred, optionally naturally derived, fatty phenols may be selected from octyl phenol, nonyl phenol, or decyl phenol.

Said fatty moiety $R^4$ group may be bonded to the phenyl ring at the ortho-, meta-, or para-position with respect to the hydroxyl group. Preferably, said fatty moiety $R^4$ group is bonded at the para-position.

The alkoxylated fatty alcohol phosphate esters or alkoxylated fatty phenol phosphate esters used in accordance with the present invention may be selected from mono-, di-, or tri-esters.

In the embodiments where di-, or tri-esters are used, each phosphate ester may comprise identical ester groups, mixtures of different alkoxylated fatty alcohol esters, mixtures of different alkoxylated fatty phenols esters, or mixtures of alkoxylated fatty alcohol esters and alkoxylated fatty phenols esters. Preferably, each phosphate ester comprises identical esters groups.

The phosphate esters used in the corrosion inhibitor composition may be homogeneous in that only one specific phosphate ester.

Alternatively, the composition may comprise a blend of different phosphate esters, including mixtures of phosphate esters of alkoxylated fatty alcohol and phosphate esters of alkoxylated fatty phenols, and/or mixtures of mono-, di-, and/or tri-esters.

Preferably, the phosphate esters comprise a mixture of mono- and di-esters. In such an embodiment the amount of phosphate monoesters may be in the range from 30 wt. % to 95 wt. % of the total phosphate esters, and the amount of phosphate diesters may be in the range from 5 wt. % to 70 wt. % of the total phosphate esters.

The alkoxylated fatty alcohol phosphate ester and alkoxylated fatty phenol phosphate ester of the present invention may be made by any suitable method, and are not limited to formation by any specific method.

By way of example, the phosphate esters of the alkoxylated fatty alcohols of the present invention may be formed by reacting alkoxylated fatty alcohols, respectively, with phosphorous pentoxide ($P_2O_5$).

The alkoxylated fatty alcohols or alkoxylated fatty phenols may prepared by initially reacting, either sequentially, or in their mixed forms, the fatty alcohols or phenols with an epoxide, preferably ethylene oxide, propylene oxide, or mixtures thereof, in the presence of an acidic or basic catalyst.

As will be readily appreciated by those of ordinary skill in the art, stoichiometric quantities of the alkoxylated fatty alcohol or alkoxylated fatty phenol are then reacted, for example, with $P_2O_5$ to form the mono-, di-, and tri-phosphate esters.

The phosphate ester may be present in the corrosion inhibitor composition in the amount from 10 to 90 wt. %. Preferably, in the amount from 20 to 70 wt. %. More preferably, in the amount from 30 to 60 wt. %. Most preferably, in the amount from 40 to 55 wt. %.

Examples of suitable phosphate esters having general structure (I) that may be used include, but are not restricted to:

alkoxylated fatty phenol phosphate esters comprising a mixture of mono and di esters

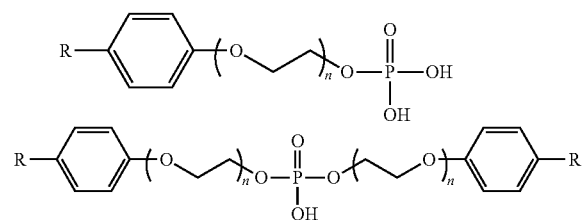

where each R represents a saturated straight chain $C_9H_{19}$ group, and n is between 5 and 7; or alkoxylated fatty alcohol phosphate esters comprising a mixture of mono and di esters

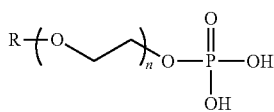

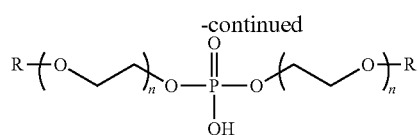

where each R represents a saturated straight chain $C_{13}H_{27}$ group, and n is between 5 and 7.

The borate ester may be a lower alkyl ester, nitrogen containing ester, or a combination thereof.

The term 'lower alkyl' is as defined elsewhere in the description. Suitable alkyl borate esters may be selected from mono- di- or tri-alkyl borates. Examples of alkyl borate esters include, but are not limited to, trimethyl borate, triethyl borate, tripropyl borate, or combinations thereof.

Preferably, the borate ester may be a nitrogen containing ester. More preferably, the borate ester is an ester of least one amino alcohol.

The term 'amino alcohol' as used herein refers to any organic compound containing both an amino and an aliphatic hydroxyl functional group.

The borate ester may be selected from mono-, di-, or tri-esters of amino alcohol. In the embodiments where di-, or tri-esters are used, each ester may comprise identical esters, or mixtures of amino alcohol esters.

The borate ester of amino alcohol may be obtainable from amino alcohols compounds of formula (III):

wherein $R^6$, $R^7$, $R^8$, and $R^9$ each independently represent hydrogen, lower alkyl, alkenyl, halo, or hydroxyl.

The term 'lower alkyl' and 'halo' are as defined elsewhere in the description.

The term 'alkenyl' as used herein, unless otherwise defined, refers to hydrocarbon radicals having at least one or a plurality, preferably no more than 2, double bonds. The alkenyl radicals may be straight chain, or branched moieties. The alkenyl radicals may each contain from 2 to 10 carbon atoms, preferably 2 to 8 carbon atoms, more preferably from 2 to 6 carbon atoms. The alkenyl radicals may be optionally substituted with a hydroxy, fluoro, chloro, bromo, iodo, nitro, or lower alkyl.

Examples of alkenyl radicals may be independently selected from vinyl, allyl, isopropenyl, pentenyl, hexenyl, heptenyl, 1-propenyl, 2-butenyl, 2-methyl-2-butenyl, isoprenyl, and the like.

Preferably, $R^6$, $R^7$, $R^8$, and $R^9$ are each independently selected from hydrogen, or lower alkyl.

More preferably, $R^6$, $R^7$, $R^8$, and $R^9$ are each independently selected from hydrogen, methyl, ethyl, n-propyl, isopropyl, n-butyl, isobutyl, sec-butyl, tert-butyl, or 2 methyl-butyl.

Most preferably, $R^6$, $R^7$, $R^8$, and $R^9$ are each independently selected from hydrogen, methyl, and ethyl.

Preferred, amino alcohols may be selected from monoethanolamine, or isopropanolamine.

In a preferred embodiment the amino alcohol may for a bidentate ligand with the boron and be bonded through both the ester group and the amine group. The amino alcohol may therefore form a five membered 1,3,2-oxazaborolidine cyclic ring with the boron. Preferably, the boron ester may be a mono- or di-1,3,2-oxazaborolidine.

The boron ester may comprise a monocyclic bidentate amino alcohol. Where the boron ester is a di- or tri-ester, two amino alcohol ligands may each form bidentate ligands thereby forming a bicyclic boron ester of amino alcohol.

It will be appreciated that where cyclic bidentate ligands on the boron of amino alcohol are formed, these may exist in equilibrium with the bicyclic, monocyclic and non-cyclic amino alcohol forms. The equilibrium composition may depend on environmental factors, for example pH.

Preferred borate esters of amino alcohols are those comprising esters of monoethanolamine, or isopropanolamine, or mixtures thereof. Particularly preferred are borates esters in which the monoethanolamine, or isopropanolamine, or both form cyclic bidentate ligands.

The borate ester used in the corrosion inhibitor composition may be homogeneous in that it comprises only one specific borate ester. Alternatively, the composition may comprise a blend of borate esters including mixtures of borate esters of different amino alcohol esters, and/or mixtures of mono-, di-, and/or tri-esters of amino alcohols.

The borate ester may be present in the corrosion inhibitor composition in the amount from 10 to 70 wt. %. Preferably, in the amount from 20 to 60 wt. %. More preferably, in the amount from 30 to 50 wt. %.

The borate esters of amino alcohols of the present invention may be made by any suitable method, and are not limited to formation by any specific method. Suitable methods would be well within the scope of the skilled person.

Examples of suitable borate esters that may be used include, but are not restricted to:

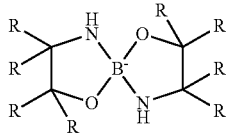

where each R represents hydrogen, methyl, or ethyl groups.

The corrosion inhibitor composition may comprise at least one inorganic metal cation. The inorganic metal cation may preferably be in the form of a salt comprising said cation and an anion.

The inorganic metal cation may be derived from a metal selected from aluminium, zinc, manganese, cerium, iron, nickel, cobalt, calcium, magnesium, molybdenum, or combinations thereof.

The corrosion inhibitor composition may comprise a mixture of at least two inorganic metal salts. Combinations of metals and salts may also be used.

The anion may be selected from the group comprising nitrates, sulphates, sulphides, and chlorides, hydroxides, oxides, carbonates, nitrates, or bicarbonates.

Preferably, the anion in said salt is selected from, sulphates, hydroxides, or oxides Preferably, the inorganic metal salt used in the corrosion inhibitor composition is selected from zinc oxide, zinc sulphate, or manganese sulphate. More preferably, the inorganic metal salt is zinc oxide.

The inorganic metal salt may be present in the corrosion inhibitor composition in the amount from 5 to 50 wt. %. Preferably, in the amount from 10 to 40 wt. %. More preferably, in the amount from 15 to 30 wt. %.

Preferably, the ratio (by weight) of phosphate ester to borate ester in the corrosion inhibitor composition is in the range from 6:1 to 1:6 respectively. More preferably, the ratio is in the range from 2:1 to 1:2. Most preferably, the ratio is in the range from 1.5:1 to 1:1.5.

In the embodiment in which an inorganic metal cation is present in the inhibitor composition in the form of a salt, the ratio of salt to the total of phosphate and borate ester is 1:8 to 1:1. More preferably, the ratio is in the range from 1:6 to 1:2. Most preferably, the ratio is in the range from 1:5 to 1:3.

The corrosion inhibitor composition may also include additional ingredients such as performance enhancing or modifying agents. The performance enhancing or modifying agents, by way of example, may be selected from flexibilisers, toughening agents/particles, core shell rubbers, flame retardants, wetting agents, pigments/dyes, flame retardants, plasticisers, UV absorbers, anti-fungal compounds, fillers, viscosity modifiers/flow control agents, tackifiers, stabilisers, and inhibitors.

The corrosion inhibitor composition may preferably be used as part of a coating composition. Said coating composition may be a paint composition, and in particular an acrylic paint composition. In particular, the paint may be a direct-to-metal acrylic paint. Preferably, the corrosion inhibitor composition comprises at least one inorganic metal cation when used in a coating composition.

The corrosion inhibitor composition may, in particular, be a post-addition to an existing acrylic paint.

The coating composition may comprise in the range from 0.05 wt. % to 10 wt. % of the corrosion inhibitor composition. Preferably, the coating composition may comprise in the range from 0.1 wt. % to 5 wt. % of the corrosion inhibitor composition. Most preferably, in the range from 0.5 wt. % to 3 wt. %.

It is envisaged that the coating composition of the present invention will find particular use as a corrosion inhibitor in paints for metals (known as direct to metal or DTM paints). In particular, the composition will find use as a coating for application to metal surfaces, including ferrous and non-ferrous substrates, for reducing corrosion of said metal in harsh environments.

It has been found that the corrosion inhibitor composition, when added as a post-addition to existing DTM acrylic paints improved corrosion resistance and thereby increase the time before failure of the coating, with little or no detrimental effects observed on other desired performance properties.

In addition, the coating composition allows for direct to metal paints which have corrosion performance similar to that of traditional light industrial paint systems whilst maintaining ease of use characteristics. The coating composition also allows for elimination of the requirement for a primer, therefore reducing the time and materials needed for complete coverage of a surface. In addition, the coating composition provides for paints which exhibit improved corrosion resistance and flash rust upon application.

In an alternative embodiment, the corrosion inhibitor composition may also preferably be used in metal containers or cans, especially those made from aluminium. In this embodiment, the corrosion inhibitor composition may be added to the contents of the container, and would therefore be in contact with the internal surface of the container.

The corrosion inhibitor composition may be added to the container contents such that it comprises in the range from 0.05 wt. % to 10 wt. % of the total container contents. Preferably, in the range from 0.1 wt. % to 5 wt. %. Most preferably, in the range from 0.5 wt. % to 3 wt. %.

The corrosion inhibitor composition may be used in a container in either aqueous or alcohol conditions.

It has been found that the corrosion inhibitor composition, when added to the contents of metal containers, improves corrosion resistance of the internal surface of the container. Typically metal containers may comprise toxic heavy metals (e.g. chromates or vanadates) to provide corrosion resistance to the metal surface. However, it has been found that use of the corrosion inhibitor composition of the present invention provides for corrosion resistance properties for the metal container surface without the need for toxic heavy metal additives.

All of the features described herein may be combined with any of the above aspects, in any combination.

In order that the present invention may be more readily understood, reference will now be made, by way of example, to the following description.

It will be understood that all tests and physical properties listed have been determined at atmospheric pressure and room temperature (i.e. 20° C.), unless otherwise stated herein, or unless otherwise stated in the referenced test methods and procedures.

Compounds as used in the following examples are identified as follows:

BE1—Borate ester—diester with monoethanolamine and isopropanolamine.

PE1—Phosphate ester—mixture of mono and di ester of an alkoxylated fatty phenol with the (poly)oxyalkylene group being six oxyethylene monomer units, and the fatty chain being a $C_9$ saturated linear chain.

PE2—Phosphate ester—mixture of mono and di ester of an alkoxylated fatty phenol with the (poly)oxyalkylene group being six oxyethylene monomer units, and the fatty chain being a $C_9$ saturated linear chain.

PE3—Phosphate ester—mixture of mono and di ester of an alkoxylated fatty alcohol with the (poly)oxyalkylene group being six oxyethylene monomer units, and the fatty chain being a $C_{13}$ saturated linear chain.

Paint—paint available commercially from Behr Process Corporation, USA.

The following test methods were used to determine corrosion performance of the corrosion inhibitor composition as an additive paints applied to metal surfaces, and as part of an additive for metal containers.

Salt Fog Corrosion Test

The 5% salt fog/spray corrosion testing provides an indication of corrosion. The salt fog/spray testing was performed in accordance with ASTM B117 method. The test was used in particular for testing the corrosion inhibitor composition when added in to paint and applied to steel.

Test Method for Aluminium Substrate

The test method was used for testing corrosion inhibitor compositions and effectiveness of reducing corrosion on an aluminium substrate. The aluminium substrates were immersed in two different sample solutions:

Sample Solution Test 1

100 mL of total solution liquid was mixed up. The solution consisted of 94 mL of water, 1 mL of corrosion inhibitor composition, and 5 mL of ethanol. The solution was placed in a bottle, and a 1100 aluminum panel was immersed in the solution. A cap was put on the bottle and set at room temperature for 250 hours. An additional sample was placed in a 70° C. oven for 120 hours. These samples were observed every two days. Once corrosion had occurred in sufficient quantities testing was halted and the panel was removed for evaluation.

Sample Solution Test 2

100 mL of total solution liquid was mixed up. The solution consisted of 58% ethanol, 1% corrosion inhibitor composition, and 41% water. Once the solution was made up, a 1100 grade aluminum panel and a 3300 grade aluminum panel were immersed in the solution. Samples were then tested at room temperature and at 70° C. for corrosion inhibition. After 216 hours the panels were removed and corrosion levels evaluated.

COMPARATIVE EXAMPLES

A number of comparative example formulations were made in order to determine corrosion inhibition properties provided by compounds on their own each in paint. These examples were made for comparative purposes and the following comparative examples do not fall with the scope of this inventive.

Examples 1-4 were formulated by addition of BE1 to 100 g of paint. No additional compounds were added.

TABLE 1

Formulations of paint and borate ester

| Compound | Example 1 (g) | Example 2 (g) | Example 3 (g) | Example 4 (g) |
|---|---|---|---|---|
| BE1 | 0.25 | 0.50 | 0.75 | 1.00 |

Examples 1-4 were all applied to steel panels. All showed flash rust and failed corrosion testing when placed in a 5% salt fog chamber.

Further examples 5-9 were also prepared by addition of various phosphate esters to 250 g of paint.

TABLE 2

Formulations of paint and phosphate ester or metal salts

| Compound | Example 5 (g) | Example 6 (g) | Example 7 (g) | Example 8 (g) | Example 9 (g) |
|---|---|---|---|---|---|
| PE1 | 1.25 | 0 | 0 | 0 | 0 |
| PE2 | 0 | 1.25 | 0 | 0 | 0 |
| PE3 | 0 | 0 | 1.25 | 0 | 0 |
| ZnO | 0 | 0 | 0 | 1.25 | 0 |
| $Mn(NO_3)_2$ | 0 | 0 | 0 | 0 | 1.25 |

Examples 5-9 were all applied to steel panels. All the panels showed poor corrosion resistance after 29 hours in a 5% salt fog cabinet.

Examples of Corrosion Inhibitor in Paint

A number of example formulations were made in order to determine corrosion inhibition properties provided by the corrosion inhibitor composition of the present invention in paint.

TABLE 3

Formulations of corrosion inhibitor compositions

| Compound | Example 10 (g) | Example 11 (g) | Example 12 (g) |
|---|---|---|---|
| PE1 | 5.1 | 5.0 | 5.0 |
| BE1 | 5.1 | 2.5 | 1.0 |
| ZnO | 2.5 | 2.5 | 2.5 |

Compositions of Examples 10-12 were added to paint at concentrations of between 0.5-5.0 wt. %. The paints were then applied to steel panels. For each of Examples 10-12 a marked improvement in the 5% salt fog corrosion resistance results were observed, as well as the elimination of flash rust on the steel panels.

Further corrosion inhibitor compositions of Examples 13-20 were formed containing 10 g of PE1 and 5 g of BE1. Each composition comprised a metal salt as shown in Table 4.

TABLE 4

Formulations of corrosion inhibitor compositions with different metal salts

| Metal Salt | Ex. 13 (g) | Ex. 14 (g) | Ex. 15 (g) | Ex. 16 (g) | Ex. 17 (g) | Ex. 18 (g) | Ex. 19 (g) | Ex. 20 (g) |
|---|---|---|---|---|---|---|---|---|
| $Ce(NO_3)_3$ | 5 | 0 | 0 | 0 | 0 | 0 | 0 | 0 |
| $Al(OH)_3$ | 0 | 4.8 | 0 | 0 | 0 | 0 | 0 | 0 |
| $MoO_3$ | 0 | 0 | 8.8 | 0 | 0 | 0 | 0 | 0 |
| $MgCO_3$ | 0 | 0 | 0 | 5 | 0 | 0 | 0 | 0 |
| $CaOH_2$ | 0 | 0 | 0 | 0 | 4.6 | 0 | 0 | 0 |
| $CaCO_3$ | 0 | 0 | 0 | 0 | 0 | 6.1 | 0 | 0 |
| $ZnSO_4$ | 0 | 0 | 0 | 0 | 0 | 0 | 5 | 0 |
| $ZnCO_3$ | 0 | 0 | 0 | 0 | 0 | 0 | 0 | 6.7 |

The compositions of Examples 13-20 were added to paint at concentrations of between 0.5-5.0 wt. %, and the paint compositions applied to steel panels. No flash rust was observed on the coated steel substrate, and the 5% salt fog corrosion resistance performance tests showed improved corrosion resistance properties when compared to paint alone. Examples 13-20 show that a variety of divalent/trivalent metal containing salts ions can be added to the corrosion inhibitor composition to provide improved corrosion protection over the paint alone.

Further corrosion inhibitor compositions of Examples 21-22 were formed containing 10 g of PE1 and 10 g of BE1. Each composition comprised a blend of metal salts as shown in Table 5.

TABLE 5

Metal salt blends

| Metal Salt | Example 21 (g) | Example 22 (g) |
|---|---|---|
| ZnO | 2.5 | 2.5 |
| $MoO_3$ | 4.4 | 0 |
| $CaCO_3$ | 0 | 3.0 |

The compositions of Examples 21-22 were added to paint at concentrations of between 0.5-5.0 wt. %, and the paint compositions applied to steel panels. Again, no flash rust was observed on the coated steel substrate, and the 5% salt fog corrosion resistance performance tests showed improved corrosion resistance properties when compared to paint alone. Examples 21-22 show that blends of multiple metal salts can be used to improve corrosion resistance when used in paints.

Examples of Corrosion Inhibitor for Metal Containers

A number of example formulations were made in order to determine corrosion inhibition properties provided by the corrosion inhibitor composition of the present invention when in solution and where the solution is in contact with a metal surface.

Solutions of corrosion inhibitor compositions of Examples 23-26 were formed containing 95 mL of water and 5 mL of ethanol as shown in

TABLE 6

Corrosion inhibitor compositions

| Compounds | Ex. 23 | Ex. 24 | Ex. 25 | Ex. 26 |
|---|---|---|---|---|
| PE1 | 0.5 g | 0.25 g | 0.85 g | 0.5 g |
| BE1 | 0.5 g | 0.75 g | 0.15 g | 0.25 g |
| $ZnSO_4$ | 0 | 0 | 0 | 0.25 g |

All the example solutions were tested with aluminium substrates in accordance with the Test Method for Aluminium Substrate as described herein. The examples showed improved corrosion resistance for aluminum substrates, with reduced pitting of the panels observed.

It is to be understood that the invention is not to be limited to the details of the above embodiments, which are described by way of example only. Many variations are possible.

What is claimed is:

1. A corrosion inhibitor composition comprising:
   at least one alkoxylated phosphate ester;
   at least one borate ester; and
   at least one inorganic metal salt selected from the group consisting of zinc oxide, zinc sulphate, and manganese sulphate.

2. The corrosion inhibitor composition according to claim 1, wherein the at least one alkoxylated phosphate ester is an ester of at least one alkoxylated fatty alcohol, at least one alkoxylated fatty phenol, or a combination thereof.

3. The corrosion inhibitor composition according to claim 2, wherein the at least one alkoxylated phosphate ester is a compound having general structure (I):

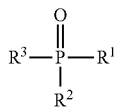

(I)

wherein
R[1], R[2], and R[3] each independently represent a hydroxyl group, a residue of an alkoxylated fatty alcohol, or a residue of an alkoxylated fatty phenol.

4. The corrosion inhibitor composition according to claim 3, wherein the alkoxylated fatty alcohol residues and alkoxylated fatty phenol residues are according to formula (II):

(II)

wherein
the group AO represents an oxyalkylene group;
the group $R^4$ is a fatty moiety;
the group Ph represents an optionally substituted phenylene group;
x represents an integer having a value of 1 or an integer in the range from 2 to 30; and
y is an integer having a value of either 0 or 1.

5. The corrosion inhibitor composition according to claim 4, wherein the fatty moieties are saturated linear fatty moieties comprising
a total of 5 to 22 carbon atoms for alkoxylated fatty alcohol residues; or
a total of 5 to 18 carbon atoms for alkoxylated fatty alcohol residues.

6. The corrosion inhibitor composition according to claim 4, wherein the oxyalkylene group is selected from the group consisting of oxyethylene, oxypropylene, oxybutylene, and oxytetramethylene, and wherein x represents an integer having a value in the range from 4 to 10.

7. The corrosion inhibitor composition according to claim 4, wherein the alkoxylated fatty alcohol residues are naturally derived fatty alcohols selected from the group consisting of capryl alcohol, pelargonic alcohol, capric alcohol, undecyl alcohol, lauryl alcohol, tridecyl alcohol, myristyl alcohol, pentadecyl alcohol, cetyl alcohol, heptadecyl alcohol, and stearyl alcohol, and said fatty alcohols are subsequently alkoxylated.

8. The corrosion inhibitor composition according to claim 4, wherein the alkoxylated fatty phenol residues are naturally derived fatty phenols selected from the group consisting of hexyl phenol, heptyl phenol, octyl phenol, nonyl phenol, decyl phenol, undecyl phenol, dodecyl phenol, tridecyl phenol, tetradecyl phenol, and pentadecyl phenol, and said fatty phenols are subsequently alkoxylated.

9. The corrosion inhibitor composition according to claim 1, wherein the alkoxylated phosphate ester is present in the corrosion inhibitor composition in the amount from 20 to 70 wt. %.

10. The corrosion inhibitor composition according to claim 1, wherein the borate ester is a lower alkyl ester, nitrogen containing ester, or a combination thereof.

11. The corrosion inhibitor composition according to claim 10, wherein the nitrogen containing ester is an ester of least one amino alcohol.

12. The corrosion inhibitor composition according to claim 11, wherein the amino alcohol has the formula (III):

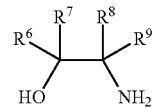

(III)

wherein $R^6$, $R^7$, $R^8$, and $R^9$ each independently represent hydrogen, lower alkyl, alkenyl, halo, or hydroxyl.

13. The corrosion inhibitor composition according to claim 11, wherein the amino alcohol is monoethanolamine or isopropanolamine.

14. The corrosion inhibitor composition according to claim 1, wherein the borate ester is present in the corrosion inhibitor composition in the amount from 20 to 60 wt. %.

15. The corrosion inhibitor composition according to claim 1, wherein the inorganic metal salt is present in the corrosion inhibitor composition in the amount from 5 to 50 wt. %.

16. The corrosion inhibitor composition according to claim 1, wherein the ratio (by weight) of alkoxylated phosphate ester to borate ester in the corrosion inhibitor composition is in the range from 6:1 to 1:6 respectively.

17. A coating composition, said coating composition comprising from 0.01 to 10 wt. % of a corrosion inhibitor composition in accordance with claim 1.

18. A method of providing corrosion resistance to a metal surface, said method comprising applying a coating composition in accordance with claim 17.

19. A method of providing corrosion resistance to a metal surface of a container, said method comprising contacting said metal surface with a corrosion inhibitor composition in accordance claim 1.

20. A corrosion inhibitor composition comprising:
at least one alkoxylated phosphate ester; and
at least one borate ester;
wherein the borate ester is a mono- or di-1,3,2-oxazaborolidine.

21. A coating composition, said coating composition comprising from 0.01 to 10 wt. % of a corrosion inhibitor composition in accordance with claim 20.

22. A method of providing corrosion resistance to a metal surface, said method comprising applying a coating composition in accordance with claim 21.

23. A method of providing corrosion resistance to a metal surface of a container, said method comprising contacting said metal surface with a corrosion inhibitor composition in accordance claim 20.

24. A method of making a corrosion inhibitor composition, said method comprising mixing:
at least one alkoxylated phosphate ester;
at least one borate ester; and
at least one inorganic metal salt selected from the group consisting of zinc oxide, zinc sulphate, and manganese sulphate.

* * * * *